(12) United States Patent
Lysen et al.

(10) Patent No.: US 6,526,829 B1
(45) Date of Patent: Mar. 4, 2003

(54) PROCESS AND APPARATUS FOR DETERMINING DAMAGE TO CYCLICALLY MOVING MACHINE COMPONENTS

(75) Inventors: Heinrich Lysen, Garching (DE); Dieter Franke, Ismaning (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/637,583

(22) Filed: Aug. 14, 2000

(30) Foreign Application Priority Data

Aug. 16, 1999 (DE) .......................... 199 38 721

(51) Int. Cl.⁷ .................. G01M 13/02; G01M 13/04
(52) U.S. Cl. .......................................... 73/593
(58) Field of Search ............................ 73/593, 659, 660

(56) References Cited

U.S. PATENT DOCUMENTS 3,554,012 A 1/1971 Söhoel
4,007,630 A 2/1977 Noda

*Primary Examiner*—Richard A. Moller
(74) *Attorney, Agent, or Firm*—Nixon Peabody LLP; David S. Safran

(57) ABSTRACT

A process and apparatus for determining the damage on at least one cyclically moving machine component, whereby a signal caused by the motion of the component is picked up by a sensor. At least one portion of the signal with an adjustable period is separated, and the remaining or separated part of the signal is subjected to damage analysis. In addition, a process and apparatus for separating periodic signal portions from a signal is provided, whereby the signal is supplied as an input signal to a rotating ring storage which is formed by cyclically arranged storage elements which are supplied in succession with the input signal currently at the input of the ring storage. A rotation frequency is synchronized with the period duration of the desired signal portions, and the desired signal portions are obtained as the output signal of the ring storage.

80 Claims, 8 Drawing Sheets

PROCESS AND APPARATUS FOR DETERMINING DAMAGE TO CYCLICALLY MOVING MACHINE COMPONENTS

BACKGROUND OF THE INVENTION

1. Field of the Invention

The present invention relates generally to a process and apparatus for determining damage to cyclically moving machine components such as roller bearings and gears, and a process and apparatus for separating periodic signal portions from a signal, such as a signal for determining damage to cyclically moving machine components.

2. Description of the Prior Art

A survey of devices and apparatus for determining damage on cyclically moving machine components by analysis of a vibration signal recorded by a sensor and caused by the motion can be found in chapter 6.1 of *Vibration-diagnostic Assessment of Machines and Systems* by Ulrich Klein, where vibration analysis of roller bearings is discussed. The conventional approach consists in coupling a vibration sensor securely to a bearing or to a corresponding machine housing, with a signal which is amplified. The amplified vibration signal is subjected to envelope curve formation by means of bandpass filtering, rectification and subsequent lowpass filtering and the frequency spectrum of the envelope curve signal being formed which is finally analyzed to draw conclusions about damage in the roller bearing. But evaluation methods in the time domain are also known, such as analysis of the envelope curve in the time domain, vibration intensity analysis, and statistical analysis of the time signal.

Examples of evaluation of the envelope curve signal in the time domain can be found in U.S. Pat. Nos. 4,007,630 and 3,554,012, whereby essentially the amplitudes are analyzed. Furthermore, a process is known in which relative extreme values of the bandpass-filtered, rectified and lowpass-filtered vibration signal are determined and stored, the intensity value of each recorded event being multiplied by the previously recorded value and the corresponding product values and the underlying time differences being sent for frequency analysis. The resulting frequency distribution is then subjected to pattern recognition according to stipulated criteria.

Pure frequency analysis processes have the inherent defect that only part of the information contained in the original time signal is contained in the spectrum and can be evaluated. In an analysis of the time signal of cyclically moving machine components, a problem arises in which a host of signals with other periodicities or frequencies. For example, the rotation frequency of the shaft, is superimposed on the signal of interest, for example, excitations which are caused by outer ring damage in a roller bearing and which also occur with the rollover frequency of the outer ring, so that these signals can only be recognized with difficulty even after envelope curve determination in the time domain. Another problem is that the periodicity of the signal portion of interest is very often not exactly known. Thus, in a radial roller bearing the rollover frequency of the outer ring is often a function not only of the rpm of the shaft, but also of the pressure angle, i.e., the axial load on the bearing.

SUMMARY OF THE INVENTION

Accordingly, it is an object of the present invention to overcome the disadvantages in the prior art to provide a process and apparatus for determining the damage on cyclically moving machine components which enables analysis of the information contained in the signal caused by the motion of the machine components. Another object of this invention is to devise an effective and flexible process and apparatus for separating the periodic signal portions from a signal.

The first object of the present invention is achieved by separating one signal portion with an adjustable period to make possible more accurate and more complete analysis of the signal since different machine components differ by different characteristic period durations in which significant damage signals can be expected. Thus, in a roller bearing the signal portions caused by outer ring damage, rolling element damage and inner ring damage generally occur with different period lengths. Separation of these signal portions in accordance with the invention allows more detailed damage analysis.

It is advantageous in achieving the second object of the invention by synchronizing the rotation frequency of the ring storage to the period length of the desired signal portions, to enable simple, flexible and reliable separation of the periodic signal portions from one signal. Each storage element preferably act as a lowpass filter for the input signal, and this action can be digitally simulated. Preferably, the ring storage is made digitally, the storage elements being formed as cyclically addressed accumulators. Frequency matching of the ring storage rotation can on the one hand be done by the period duration of the desired signal portions being determined from the signal, for example, by means of search tone analysis, Fourier transform or cepstrum analysis and the storage being rotated with the frequency determined in this way. Alternatively, rotation of the ring storage can be directly synchronized with the input signal, and this can occur by means of a phase shifter, whereby the contents of the storage elements being multiplied by the derivative of the input signal and the result being accumulated and at certain instants the rotation frequency of the ring storage being changed according to the accumulated value. Moreover, preferably the shape of the input signal for synchronization is processed, and it can be lowpass filtration or the portions which do not have the period duration of the desired signal are removed from the input signal by means of another rotating ring storage.

Preferably, the aspects of the present invention are used for the vibrational analysis of machine components such as roller bearings, gears or rollers for the continuous manufacture of a product, whereby the components stamp the surface of the product. In the case of a roller bearing, preferably one period form filter each is assigned to the outer ring, the inner ring and/or the rolling elements, and each have rotation frequencies which correspond to the outer ring rollover frequency, the inner ring rollover frequency and the rolling element rollover frequency. In addition, preferably the output signal of the other period form filter at the time is subtracted from the signal before it is supplied to the respective period form filter as the input signal to remove signal portions which have the "wrong" periodicity. There is preferably another period form filter which is synchronized to the rpm of the shaft and which has an output signal which is subtracted from the signal before it is supplied to other period form filters as the input signal. Furthermore, the change of the contents of the ring storage of the period form filter in time can be analyzed for the outer ring, the inner ring and the rolling elements in order to determine the unbalance or balanced load acting on the bearing. The sum of the balanced load and the unbalance can be determined by forming the ratio between the amplitudes of the signal portions originating from the inner ring contact and the outer ring contact for the output signal of the roller bearing period form filter.

Furthermore, period form filters can also be used to determine from the rotation frequency of the ring storage the rollover frequencies of the outer ring, the inner ring and the rolling element and from them the pressure angle and the contact angle of the roller bearing. Instead of a common period form filter for all rolling elements, one period form filter can also be assigned to the each rolling element individually. To counteract possible slip of the rolling element outside the load region, the quality of the rolling element period form filter can be set such that it oscillates transiently within one cage revolution. In doing so, for each cage revolution its own map of the contents of the ring storage can be produced, the phase shift of different maps being determined and the maps being corrected with respect to this phase shift and then added to form the output signal. Alternatively, the phase of rotation of the ring storage of the rolling element period form filter can be controlled according to the ascertained slip angle to compensate for rolling element slip. In this case, the phase-staggered addition of the individual images is not necessary. If neither phase correction of the signals or the maps nor phase correction of the rotation of the ring storage is undertaken, then the unknown rolling element slip can be compensated by sorting the output signal of the period form filter for the rolling elements by its amplitude, from which then the damage length for the rolling elements can be determined.

DETAILED DESCRIPTION OF THE PREFERRED EMBODIMENTS

Figure 1:
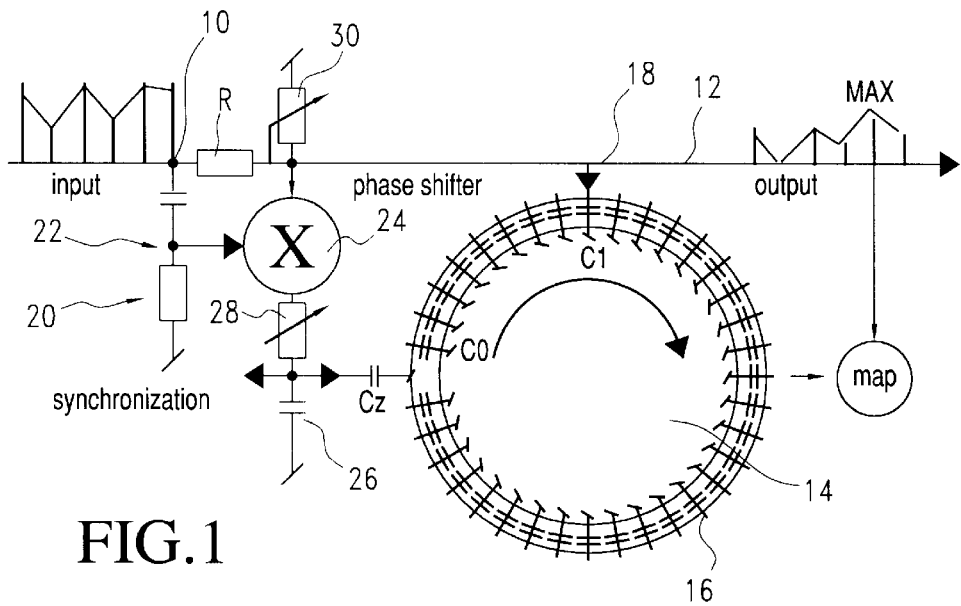
FIG. 1 shows an analog equivalent network of a period form filter in accordance with the present invention.

And referring now to the drawings, in which FIG. 1 schematically shows a similar equivalent network of the device for separation of periodic signal portions from a period form filter. The major function of one such period form filter consists in separating from a time signal which is present at the input 10 all signal portions which have a certain periodicity or period duration and in outputting them at the output 12. The important element of one such period form filter is the ring storage 14 which has a plurality of cyclically-arranged storage elements 16 and which "rotates" with a controllable period or frequency of revolution. Accordingly, the storage elements 16 are connected in succession each to the input 10 through a coupling node 18 according to the "rotation" frequency. The signal at the output 12 in this embodiment is likewise produced by the output 12 being connected according to the rotation frequency of the ring storage 14 via the coupling node 18 to the individual storage elements 16. This coupling and decoupling however need not take place via the same coupling node 18, but can also include two separate coupling nodes for the input and the output. The concept of "rotation" with respect to ring storage should generally be referenced to the access sequence and in no way means that the storage elements must for example rotate physically. Rather it means that the storage elements are cyclically accessed with a certain cycle duration, i.e., they are connected to the input, one cycle seamlessly following the next.

Each individual storage element 16 acts as a lowpass filter for the input signal present at the time, in FIG. 1 the storage elements 16 being shown as capacitors C which form a lowpass filter with a resistor R connected to the input path. If it is assumed that Z storage elements 16 are contained in the ring storage 14, the period form filter acts overall as a lowpass filter with a time constant $\tau = Z \times R \times C$. The basic mode of operation of the period form filter is explained in the following. At the input there is a signal which, in addition to the signal portion with the period T, has other signal portions which are either nonperiodic or have a period duration which differs from T. Rotation of the ring storage 14 having a duration of revolution T results in that for the existing phase synchronization, events having a period duration T with each revolution of the ring storage 14 hit the same storage element 16 and allow its contents to gradually grow.

In the embodiment shown in FIG. 1, the charge stored in the corresponding capacitor C and thus the tapped voltage increase and conversely events which do not have periodicity T with each revolution of the ring storage 14 hit different storage elements 16 and are in this way "averaged out" of the input signal or contribute only to a uniform background. After a certain number of revolutions of the ring storage 14 which is dependent on the quality of the lowpass filter formed by the ring storage 14, in the ring storage 14 in the form of a charge or voltage stored in the storage elements 16 essentially only one map of the signal portion with a period duration T is contained so that at the output 12 essentially only this signal portion appears, while the remaining signal portions have been filtered out. Once the period form filter has completed "transient oscillation", i.e., once the signal at the output 12 has exceeded a certain threshold value or has reached a peak, the contents of the ring storage 14 are mapped to the outside, i.e., stored in a static storage.

An important requirement for the effectiveness of the period form filter is choosing the correct rotation frequency of the ring storage 14, only then optimum separation of the desired signal portion with a period duration T being achieved when the period of rotation of the ring storage 14 agrees with this desired period T. One problem that exist is that the desired period duration T is either not known, not known accurately, or not constant. One possible solution for this problem is to determine the desired period duration by means of search tone analysis or Fourier analysis. This is done by searching for fundamental and harmonic waves using cepstrum analysis and controlling the rotation frequency of the ring storage 14 accordingly. This solution is especially suited for an essentially constant desired period duration, however, the described analysis of the input signal can also be carried out continuously or at certain repetitive intervals.

At a varying desired period duration it is also possible and favorable to synchronize the rotation of the ring storage 14 by means of control directly with the input signal. This can take place by means of a synchronization means 20 which includes a differentiator 22 consisting of a capacitor C, a resistor R, a multiplier 24 and an accumulator 26. The contents of the storage elements 16 are supplied by means of a coupling node 18 to the synchronization unit 20 which acts as a phase shifter, and by means of the multiplier 24 which multiplies it by the input signal derived by the differentiator 22, the result being accumulated in the accumulator 26. The contents of the accumulator 26 are then used to change the rotation frequency of the ring storage 14 at certain instants. This can take place by the rotation frequency at certain instants being increased or decreased by a value which is proportional to the contents of the accumulator 26, the proportionality constant being chosen such that the control circuit is stable. The instant can be each n-th revolution of the ring storage 14. The proportionality factor can be set by means of a variable resistor 28. To facilitate the start of period synchronization, or to counteract the loss of period synchronization, the lowpass filter corner frequency of the ring storage 14 can be increased, the input signal being attenuated and/or lowpass-filtered. This is indicated by a variable resistor 30 which is set to infinity after completed synchronization.

It is also favorable for synchronization if the input signal is conditioned accordingly for the synchronization means 20, for example, by the addition of flanks by lowpass filtration. It can be favorable if the portions which have no periodicity in the area of the desired period duration are removed from the input signal for synchronization by means of another period form filter. If the desired signal portion is an amplitude-modulated signal shape, the modulation should be determined and the signal should be demodulated (when the unknown signal portion is amplitude modulated, otherwise the contents or output of the ring storage 14 fluctuate accordingly). Alternatively the above described mapping function of the ring storage content can also be used at the maximum ring storage output signal in order to map the amplitude-modulated desired signal into a peak.

Signal pretreatment or conditioning processes can in general be, besides demodulation processes, among others a Fourier transform or a wavelet transform or a method based upon one or more filtering processes. For purposes of demodulation, among others, rectification with envelope curve formation which can be done in analog or digital form, a Hilbert transform, a wavelet transform for determination of sideband intensities at a carrier frequency with subsequent processing of the information determined in this way and methods which combine an original signal with time derivatives and/or integrals can be carried out. Prefiltering using wavelets can be done with consideration of the following: if a time-discretized (therefore sampled) signal having a simple window or correlation function is processed, high frequency and low frequency portions of this signal can be easily separated.

If a function is used as the window which for two samples undertakes one convolution with (+1, +1), simple lowpass filter behavior is obtained by this averaging; this leads to low frequency spectral portions. A convolution with the function (−1, +1) conversely splits off high frequency portions. This approach can, on one hand, be considered the application of very simple FIRDigital filters to a time-discretized signal, while on the other hand a similarity to a Hadamard, Haar, or Walsh transform can be recognized. This approach is accordingly comparable to the use of two wavelet base functions which have been sought for this purpose and which now have a continuous range of the function values. The "convolution" of the original signal with a first and a rather low frequency wavelet function leads to low frequency output signals which can then be supplied to the ring correlation form filter. The use of a wavelet base function which is short in time then yields high frequency signal portions for a corresponding further application.

FIG. 1 shows an analogous equivalent network for a period form filter. The period form filter can also be made in analog form, wherein the ring storage 14 would be a rotating arrangement of capacitors. Preferably, the analog functions can also be digitally simulated. The ring storage 14, however, is preferably made digital, while the storage elements 16 are made as cyclically addressed accumulators. The input signal is digitized with a sampling rate which corresponds to the product of the rotation frequency and the number of storage elements 16. Preferably, it is a ring storage array consisting of $2^n$ elements with a read/write pointer which is incremented by the rounded value which results from the number of elements divided by the sampling rate divided by the desired period duration or "rotation" period of the ring storage 14. Thus, in this digital version the pointer "rotates" to the storage elements 16. The storage depth is then the product of the sampling rate and the period duration.

At a constant scanning rate, a change of the period duration or rotation frequency leads both to a corresponding change of the storage depth and also the increment. Accordingly, when the rotational frequency is synchronized to the desired period duration the increment or the storage depth can be changed. For example, in the case of the phase shifter 20, a value which is proportional to the contents of the accumulator 26 is added to the ring storage depth or subtracted from it and the increment changed by a value which is proportional to the contents of the accumulator 26. In the digital version, the period form filter can be made such that the average of the input signal which occurs during the corresponding sampling interval is accumulated into the corresponding storage element 16. A period form filter can also be used to specifically eliminate a signal portion with a certain period from the signal by subtracting the output of the period form filter from the input signal. Furthermore, if several signal portions with different periodicity are to be separated, several different period form filters with different rotation frequency can be used, and the outputs of the period form filter, which is the other one at the time, can be subtracted from the input signal for a certain period form filter to facilitate the separation of the signal portion with the corresponding periodicity.

Figure 10:
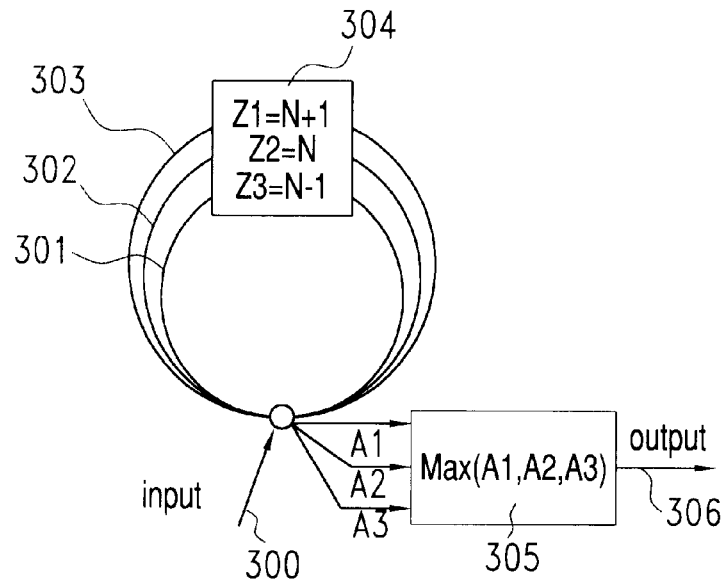
FIG. 10 shows a different embodiment of a period form filter in accordance with the present invention.

Instead of the implementation of direct synchronization of the period form filter to the input signal by means of the phase shifter 20 as shown in FIG. 1, an approach shown in FIG. 10 can also be used. In this embodiment, instead of using a single period form filter or ring storage, three period form filters or ring storages 301, 302, 303 are used and rotate in parallel with a slightly different rotation frequency or period. The embodiment shown in FIG. 10 can equally be considered a single period form filter with three ring storages, or a combination of three period form filters with one ring storage each. A common coupling node 300 supplies an input signal in parallel to each period form filters 301, 302, 303 and from each of the period form filters 301, 302, 303 to separately remove the output signal which is supplied to a unit 305. The unit 305 acts as a selection stage which delivers at the output 306 an output signal of that period form filter which instantaneously delivers the output signal with the greatest amplitude, i.e. the period form filter with the maximum output signal is selected each time as the current or "valid" period form filter. In addition, the unit 305 acts as a controller for the rotation period durations or frequencies by controlling the rotation frequencies of the period form filters 301, 302, 303 by means of a second unit 304 such that the current period form filter, i.e. the one with the instantaneously largest output signal amplitude, is the period form filter with the average rotation period duration (in FIG. 10 this is the period form filter 302).

Accordingly, the rotation period durations of each period form filter 301, 302, 303 are each changed to the same direction, i.e. they are either decreased jointly when the period form filter 301 with the shortest rotation period has been determined as the current period form filter, or they are increased jointly when the period form filter 303 with the longest rotation period has been determined as the current period form filter. The increment can be the same or different for all period form filters 301, 302, 303, but is at maximum feasibly as large as the period difference of two "adjacent" period form filters. When the period form filter 302 with the average rotation period has been determined as the current period form filter, the period durations are not changed.

The determination of the current period form filter takes place after each revolution. Because there is only one integrating element, specifically the (current) period form filter or its lowpass action, the proposed control is stable. The unit 305 therefore causes the period form filters 301, 302, 303 and thus the period form filter 302 with the average period duration to be synchronized, are controlled to the period duration of the signal portions of interest so that no further synchronization means is necessary. Furthermore, at output 306, the correct, i.e. best fitting, signal is delivered. The described control concept is not limited to the use of three period form filters, but also more period form filters can be used, accordingly control to one or the period form filter with an average period duration being exercised. FIG. 10 further shows the digitally executed period form filters 301, 302, 303, the change of the rotation period duration taking place by changing the storage depth Z and the storage depths of the period form filters 301, 302, 303 differing by one. In a control loop the individual storage depths are then raised or lowered by one. The quality of the period form filters 301, 302, 303 is set roughly to N.

Figure 15:
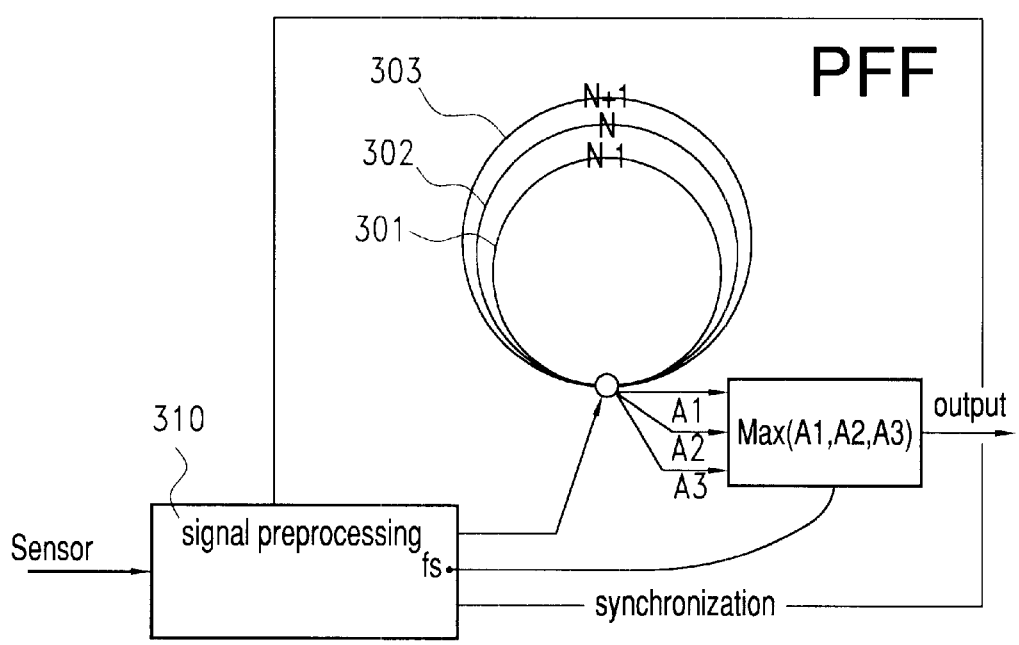
FIG. 15 shows a modification of the embodiment shown in FIG. 10.

FIG. 15 shows a version of the embodiment shown in FIG. 10, whereby preprocessing of the input signal which originates from a sensor takes place by a stage 310. The basic possibilities for signal preprocessing in the stage 310 have already been explained in conjunction with the description of the embodiment shown in FIG. 1. FIG. 15 shows the possibility that the sampling frequency of the period form filters 301, 302, 303, which is kept variable in the aforementioned manner for synchronization purposes, can be used at the same time as the sampling frequency for the signal preprocessing processes which take place in the stage 310. Alternatively, fixed sampling frequencies can be used, whereby for synchronization a variable number of ring storage cells are used. With the described synchronization principle an oscillograph with automatic period search can be implemented, with the often complex trigger condition for the internal signal in conventional oscillograph being eliminated.

Figure 11:
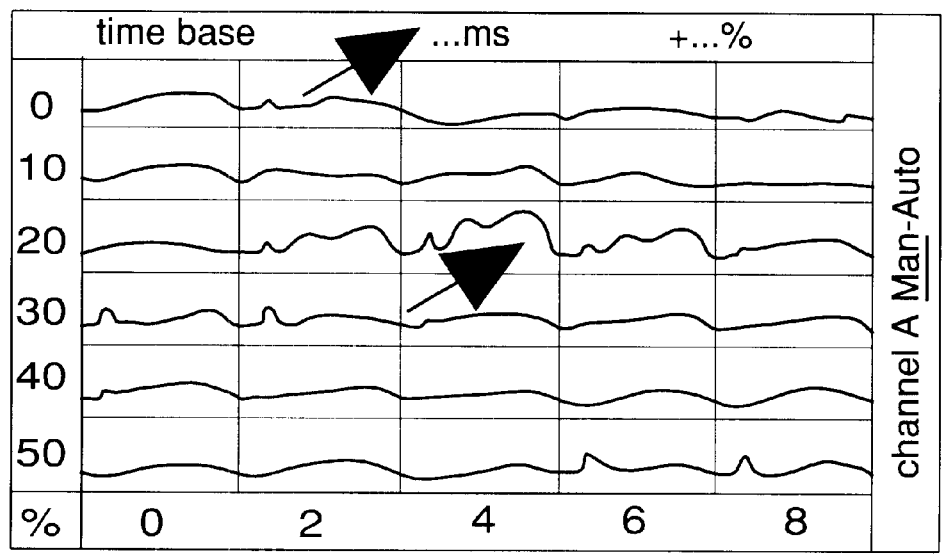
FIG. 11 shows a schematic view of the display of a multiperiod signal analyzer.

Furthermore, the concept of several "parallel" period form filters can also be expanded such that for one oscillograph or signal analyzer there is a plurality of period form filters with only slightly different period durations in order to cover a certain range of period durations, for example in the periphery of one octave (factor 2) with a certain quality. The quality of the individual period form filters can correspond roughly to the respective storage depth. If the expected "center period" is known accurately enough and is stable, tracking of the period duration as was described above can be eliminated and the rotation period durations are stipulated or set. Otherwise, control to one period form filter with an average period duration is exercised, i.e. the period durations are jointly changed such that this period form filter has the maximum output signal. As shown in FIG. 11, the contents or output signals of the individual period form filters are then displayed reduced in size on a screen and the user can selectively zoom out certain period form filters for signal analysis or evaluation and select the "best" period form filter for further signal analysis. The selection can, however, also be made automatically, feasibly the period form filter with the largest output signal being chosen. Overall this "multiperiod concept" represents a very user-friendly approach.

Instead of using period form filters with a rotating ring storage, separation of signal portions with a certain period duration can also generally take place by dividing a signal into sections with a certain duration each which corresponds roughly to the desired period duration. The phase shift of the signal sections to one another is determined, the signal sections are corrected with respect to the phase shift and the signal sections which are phase-corrected in this way are added to obtain the desired signal portions with the desired period duration. The signal sections can follow one another seamlessly if it is known that over a certain signal time interval no "interesting" signal portion can be expected, in this interval the acquisition of signal sections can be omitted, then feasibly triggering being used.

In phase correction it is possible to proceed such that the phase shift between the first and the second signal section is determined and then the first and the second signal section are added phase-corrected and that the resulting summation signal is stored, this procedure being iteratively repeated for the other signal sections on the condition that the summation signal assumes the role of the first signal section and the signal section currently processed assumes the role of the second signal section. The phase shift can be determined by determining the maximum of the correlation between the pertinent signals or sections, for seamlessly succeeding sections feasibly the maximum of the ring correlation being ascertained. Preferably, the weighting of a signal section during addition is proportionate to the value of the maximum correlation determined at the time in order to more weakly consider poorly correlated signal sections in the sum. The sum of the determined correlation peaks is a measure of the confidence of the determined summation signal from the sections. The desired period duration can be regularly checked and the signal section durations can optionally be matched to changes of the desired period duration.

The action of the process includes, therefore, separating from a signal which contains sections with period durations in agreement, but with unknown phase relationship, by pulling out these sections and by phase-correct superposition, all signal portions with these period durations. One relevant result can then be obtained itself when the section duration does not agree exactly with the period duration. The subdivision into sections can take place for example only after the signal is recorded, i.e. the entire signal train is stored before evaluation, or the subdivision or section formation takes place when the signal is recorded. In the latter case the signal can be picked up by a ring storage, for example, as shown in FIG. 1, the rotation duration being set to the desired period duration, but the individual signal sections not being added or accumulated simply uncorrected, but the ring storage after each revolution being read-out and reset, the read-out "image" of the ring storage then representing the current signal section which is added to the existing summation signal from the preceding "maps" in a second storage, however before addition as described above the relative phase angle being determined for example by determining the correlation peak and optionally being corrected, and weighing taking place during addition for example according to the correlation peak. Here therefore ultimately there are two ring storages so that one such period form filter can also be considered a period form filter with two planes (complexity 2), finally the summation signal of interest being present not as the contents of the first ring storage which directly taps the signal, but as the contents of the second ring storage in which the phase corrected sum of the individual periods is formed, by which an automatically phase-corrected period form filter can be implemented.

To reduce the computer cost this principle can be modified such that not the complete calculation of the correlation function, i.e., for all phase differences, takes place, but only for small phase differences, so that only the "trend" of the phase shift, i.e. whether backward or forward, is determined for each section; this is at least sufficient if only small phase differences occur. The shift of the current section before addition in the direction of greater correlation takes place accordingly, i.e. so-to-speak only the relative maximum of the correlation is determined for small phase differences. In a certain way this "differential" approach is considered only a derivation of correlation. This principle can also be used for synchronization of a period form filter by the period form filter "noticing" the phase shift determined at the time and the rotation phase or duration being tracked accordingly.

Period form filters are especially well suited in the determination of damage to cyclically moving, especially rotating machine components since damage generally in a signal caused by motion and recorded by a sensor, especially a vibration signal, leads to signal portions with a periodicity which is characteristic for the respective machine components, however the periodic signal portions of interest generally being superimposed with signal portions of another periodicity or with nonperiodic signal portions. Here period form filters can be used to eliminate signal portions with a certain (disruptive) periodicity from the signal to be analyzed, or they can be used to separate a signal portion of interest with an adjustable period from the signal in order to subject this portion to damage analysis.

Figure 2:
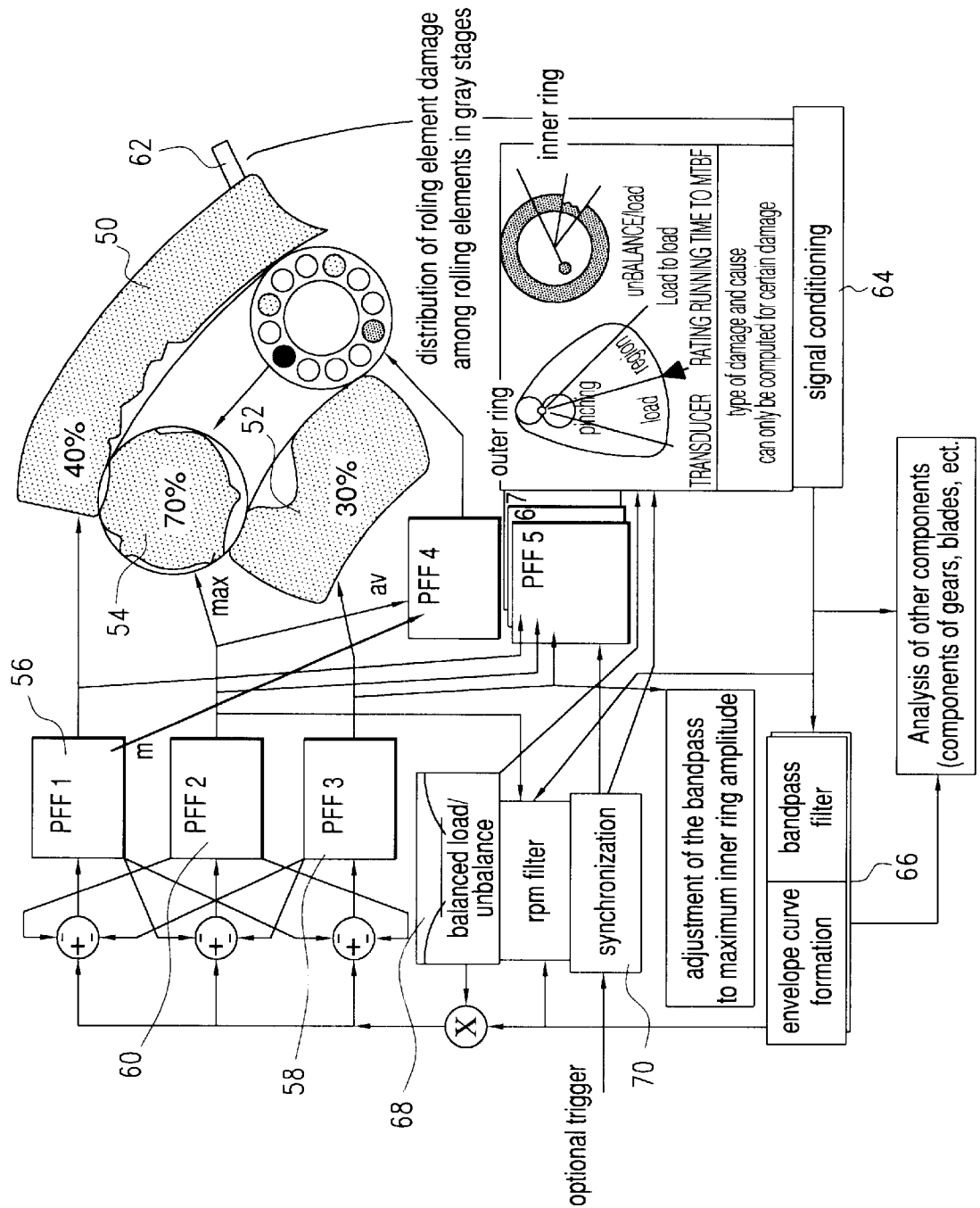
FIG. 2 schematically shows a roller bearing diagnosis system in accordance with the present invention.

FIG. 2 shows the use of period form filters in a roller bearing diagnosis system. The roller bearing components to be monitored are the outer ring 50, the inner ring 52 and the rolling elements 54, one period form filter 56 and 58 being assigned to the outer ring 50 and the inner ring 52 respectively, while a total of one period form filter 60 is assigned to the rolling elements 54. The rotational frequencies of the period form filters 56, 58 and 60 correspond to the outer ring rollover frequency, the inner ring rollover frequency and the rolling element rollover frequency. A vibration transducer 62 is permanently coupled to the outer ring 50 in order to convert its vibrations into a corresponding electrical vibration signal. The vibration signal generated in this way is supplied to a signal conditioning stage 64 and then to a filter stage 66 in which bandpass filtering and demodulation or envelope curve formation, for example by means of one or more peak value detectors, takes place. The bandpass filter 66 can be adjusted such that a maximum output signal amplitude of the inner ring period form filter 58 results.

A damage signal is formed by a rolling element 54 rolling over damage in the running surface of the outer ring or inner ring or the damaged peripheral area of a rolling element rolling on the running surface of the outer ring or inner ring, in all cases the rolling element 54 being deflected and in doing so experiencing a force corresponding to the stiffness of contact with the inner ring 52 and the outer ring 50, by which according to the transfer function for the deflection of the rolling element an acceleration signal being produced which is finally acquired by the sensor 62. The acquired signal is thus "distorted" by this frequency-dependent transfer function and can be accurately assigned to the damage depth and the damage form only when the transfer function is known. Preferably therefore a dynamic model of the installed bearing and the coupled machine components is developed in order to determine the transfer function and to reconstruct the genuine damage signal before it is analyzed.

Since this transfer function is different depending on whether the damage signal is produced by contact between the rolling element and the inner ring or the rolling element and the outer ring, the transfer function for both cases is determined, then in a signal conditioning stage there being one frequency filter each, i.e. a bandpass filter, with a transfer function which is chosen such that the determined damage signal transfer function is compensated. In this way the signal in the stage 64 is divided into two branches with different conditioning (not shown in FIG. 2), the one branch being supplied to the outer ring period form filter 56 and the other to the inner ring period form filter 58. The rolling element period form filter 60 can be provided doubled, then to each of the two period form filters one of the two differently frequency response-corrected signal branches being supplied.

Preferably the filter stage 66 is followed by a period form filter which is synchronized to the rotation frequency of the bearing shaft and its output signal is subtracted from the signal delivered by the filter stage 66 to remove disruptive portions with the periodicity of the shaft from the signal to be analyzed (not shown). Afterwards the vibration signal is multiplied by a signal from a unit 68 which is designed to compensate for the effects of a balanced load or unbalance on the signal. Finally, the vibration signal is supplied to each of the period form filters 56 to 60, however beforehand the output signals of the other two period form filters 56 to 60 being subtracted in order to facilitate for each of the period form filters 56 to 60 the separation of the signal portion with "its" periodicity. The period form filters 56 to 58 are preferably, for example by means of a phase shifter described in FIG. 1, synchronized directly to the respective input signal in order to easily compensate for rpm changes of the shaft and pressure angle or contact angle changes of the bearing by load changes. In particular, in this way the outer ring rollover frequency, the inner ring rollover frequency and the rolling element rollover frequency can be determined by determining the rotation frequency of the corresponding period form filter 56 to 60 at which the respective output signal becomes maximum.

Since the corresponding frequencies depend on the pressure angle and the contact angle, the contact angle and thus for example in a radial bearing the axial load can be determined. A possible alignment error can be recognized from the change of the axial load in turn which occurs with twice the shaft frequency. If furthermore there is also a period form filter 70 for the cage rotation frequency, the slip of the rolling elements can be determined from the ratio of the cage rotation frequency which can be determined therewith to the shaft rotation frequency. Conclusions regarding the lubrication state of the bearing can be drawn from the time development of this slip. The output signal of the outer ring period form filter 56 in the ideal state represents a map of the running surface of the outer ring, its however being averaged in sections according to the number of rolling elements, i.e. the output signal represents averaging over all sections. This applies equally to the output signal of the inner ring period form filter 58.

Figure 3:
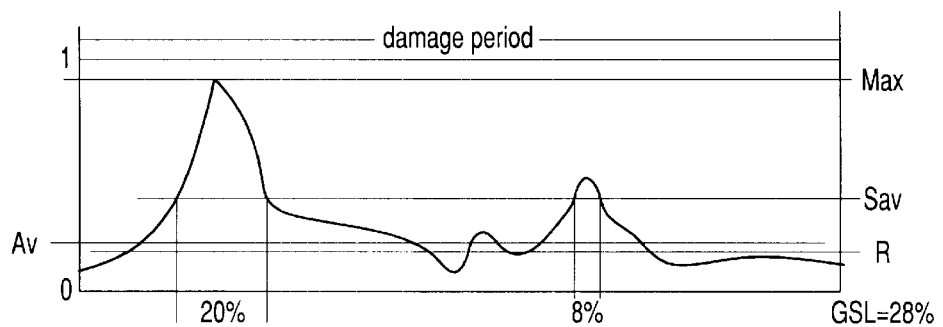
FIG. 3 shows the sample behavior of the output signal of the period form filter of FIG. 2.

FIG. 3 shows for example the behavior of one such damage signal of the outer ring or inner ring period form filter. To obtain diagnostic information from this signal, among others the following operations can be undertaken. The average amplitude Av of the signal is formed. Then all amplitudes which exceed this average amplitude Av are considered the damage signal. Then the average damage amplitude Sav is computed from these damage amplitudes. Furthermore the maximum damage amplitude Max is formed. The total damage length GSL is computed in percent of the damage period or damage signal period, and it can be defined for example as the sum of all times during which the damage amplitude is larger than the average damage amplitude Sav. In this example the total damage length is 28%. The average basic noise level R can be formed at which averaging is done over all amplitudes which are less than the average amplitude Av. Finally the ratio of the maximum amplitude to the basic noise level can be formed. Feasibly the maximum damage amplitude, the total damage length, the average damage amplitude and the basic noise level are traced with respect to their change in time. Likewise the damage shape, i.e. the shape of the damage signal, is traced with time. For these quantities, depending on the type of damage, the type of bearing and the type of support, boundary values can be formed; an alarm is triggered when they are exceeded. Feasibly the damage signal is graphed such that the time zero is at the first minimum before the amplitude maximum.

Figure 4:
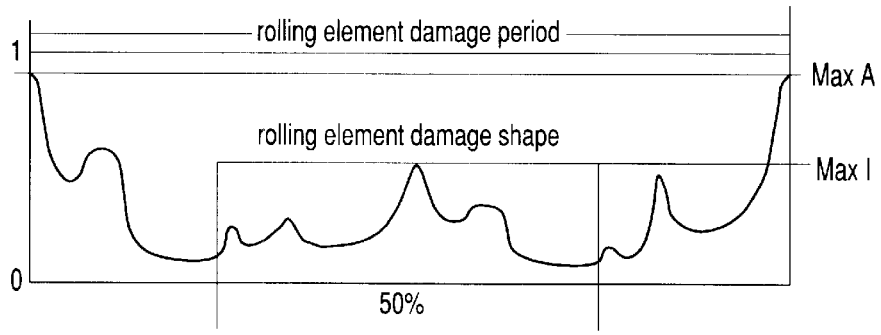
FIG. 4 shows the sample behavior of the output signal of the rolling element period form filter of FIG. 2.

FIG. 4 shows a sample damage signal characteristic of the rolling element period form filter 60. In contrast to the outer ring and inner ring damage signals, the rolling element damage signal generally shows a double structure which originates from the fact that each rolling element 54 generally rolls at the same time both on the outer ring 50 and the inner ring 52, by which the damage structure on the rolling element running surface during the rollover period of the rolling element 54 produces one damage signal during contact with the outer ring 50 and a second similar damage signal during contact with the inner ring 52. The central area in FIG. 4 shows the damage signal which originates from the inner ring contact, while the two edge areas contain the damage signal which originates from the outer ring contact. Since the intensity or the amplitude of the inner ring contact signal or outer ring contact signal depends on the coupling between the rolling elements 54 and the outer ring 50 or inner ring 52, the amplitude ratio between the two signals can be used to draw conclusions regarding the force ratios in the bearing. In a pure radial bearing without a balanced load and unbalance, for example the inner ring contact amplitude of the rolling element damage signal should disappear, since the rolling elements 54 are not pressed against the inner ring 52, while the outer ring contact signal should occur according to the centrifugal forces of the rolling elements 54 caused by the cage rotation frequency. The centrifugal force portion can however be computed from the knowledge of the bearing geometry and the shaft or cage rpm. The inner ring contact signal should on the other hand originate exclusively from the sum of the (radial) balanced load and the unbalance so that the sum of the balanced load and the unbalance can be computed from the ratio between the inner ring contact amplitude and the outer ring contact amplitude to be determined from the rolling element damage signal, and the knowledge of the centrifugal force. The bandpass filter 66 of the rolling element period form filter 60 should be set to the rolling element resonant frequency. If inner ring damage or outer ring damage is present, the rolling element resonant frequency can be determined by changing the bandpass filter for the outer ring period form filter 56 and the inner ring period form filter 58 while observing the corresponding output signal. If the bearing load is known, the rolling element resonant frequency can be computed. If any bearing damage is present, the bearing resonant frequency, i.e. the resonance between the shaft and the bearing block, can be determined.

It is possible to distinguish between the damage signals caused by a balanced load or an unbalance by studying the change of the damage signal with time, since unbalance modulates the damage signals with a frequency different than a balanced load. Thus for example in a radial bearing in which the shaft is attached to the inner ring, the outer ring signal is not modulated by a balanced load, but is modulated by an unbalance with the shaft frequency. The inner ring signal on the other hand is modulated by a balanced load with the shaft frequency, while it is not modulated by the unbalance. The rolling element signal conversely is modulated both by the unbalance and by the balanced load, for unbalance the signal being modulated with the difference between the shaft frequency and the cage frequency, while a balanced load modulates the signal with the cage frequency. One such unbalance or balanced load analysis can be done for example by the output signals of the outer ring period form filter 56, the inner ring period form filter 58 and the rolling element period form filter 60 each being supplied to another period form filter 72, 74, and 76 as the input signal which is synchronized to the rotational frequency of the shaft.

The period form filter 70 which is synchronized to the cage frequency acquires as the input signal an output signal of the outer ring period form filter 56 scaled to the number of rolling elements and the average output signal of the rolling element period form filter 60 from which information about the rolling element damage distribution on the individual rolling elements can be obtained. For direct evaluation of the output signal of the period form filter 60 the maximum output signal is used which relates mainly to the most heavily damaged rolling element 54. Basically, in the presence of a balanced load and/or an unbalance the rolling element damage signal makes it possible to draw conclusions about the distribution of the damage over the individual rolling elements, since for a uniform damage distribution over all rolling elements for example neither an unbalance nor a uniform balance cause modulation of the signal, while a nonuniform damage distribution, for example, damage of only one rolling element, causes maximum modulation. One special problem in the determination and evaluation of a rolling element damage signal arises when a balanced load or unbalance acts on the bearing so that the rolling element produces a periodic signal only in the load area and outside the load area experiences an undefined slip with respect to the inner ring, so that the signal which the rolling element produces upon two succeeding passes through the load area does not have a defined phase relationship, i.e. even at a constant rolling element rollover frequency in the load area the same signal shapes after several rolling element revolutions would no longer end up in the same storage elements of the corresponding period form filter.

This problem can be resolved on the one hand such that the rolling element period form filter 60 is tuned with such a low quality that during motion of the rolling element 54 in the load area it transiently oscillates, and the time constant for example can be chosen such that it corresponds to the product of the cage period and the load angle divided by 360°. As soon as the output signal of the period form filter 60 then becomes maximum, a map is produced. Based on the required low quality of the period form filter 60 and the few rolling element revolutions which contribute to it, however the case can occur in which the map does not contain enough information for analysis. In this case averaging over several revolutions of the rolling element is necessary, however the problem arising that the phases of the maps of the period form filter which have been obtained in this way do not agree. One possible solution then consists in that this unknown phase shift, i.e. the rolling element slip, is determined for example from the peak of the ring correlation between the individual maps which each result from one pass of the rolling element through the load area (i.e. it is determined in which phase angle the product of succeeding maps is maximum). Then the individual maps are each shifted by the ascertained phase shift and added, the weighting being dependent on the respectively determined maximum value of the correlation in order to take into account less heavily the poorly correlated signals. After each pass of the rolling element through the load area the ring storage of the period form filter is reset.

To compensate for the phase shift or the slip angle, the synchronization, in this case the phase of the ring storage rotation of the period form filter, can also be controlled from the knowledge of the slip angle or the phase shift to the rolling element revolution or cage revolution. In this case it is not necessary to reset the period form filter and the map generation, but the period form filter can be conventionally operated (aside from the phase correction of rotation after each cage revolution). Information about the lubrication state can be obtained if so desired from the knowledge of the slip angle of the rolling elements. Differences in the slip angle between the individual rolling elements indicate cage faults, for example jammed rolling elements (the slip angles of individual rolling elements can be determined by assigning to each rolling element its own period form filter, as is detailed below).

Figure 5:
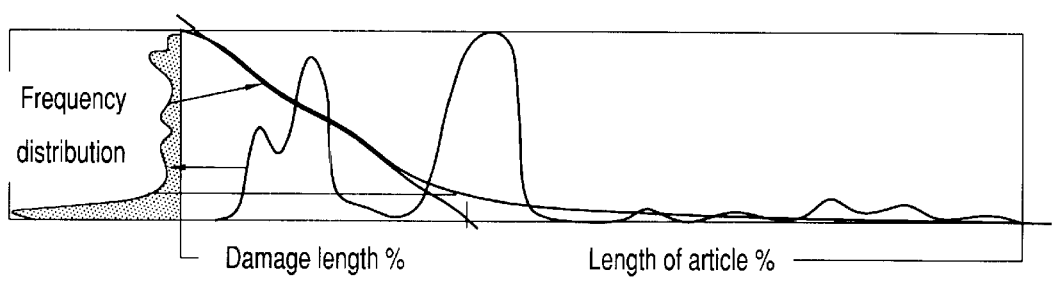
FIG. 5 shows the sample behavior, the corresponding amplitude-sorted signal behavior and frequency distribution of the output signal of the rolling element period form filter of FIG. 2.

One alternative approach to determining the rolling element damage from the rolling element damage signal in spite of rolling element slip is to use a form analysis process which eliminates the phase angle from the form, i.e. the corresponding period form filter is operated without phase correction. For this purpose known processes can be used, such as for example amplitude classification, event analysis, averaging, determination of the direct portion or the alternating portion, formation of the effective value, etc. But a process is preferred in which the total damage length is determined by amplitude sorting. To explain this process, FIG. 5 for example shows a rolling element damage signal which is integrated or averaged over several cage revolutions and which is obtained without phase correction (thin solid line in FIG. 5). The determined signal is now re-sorted with respect to the magnitude of its individual amplitudes, i.e the largest amplitudes are on the left and the smallest amplitudes are on the right (thick solid line in FIG. 5). From this amplitude-sorted distribution then the relative damage length can be determined, preferably by matching a compensation function, for example using the least squares method, to the amplitude-sorted distribution. The compensation function can be chosen such that it contains four parameters which correspond to the damage depth, the damage length, the noise amplitude and the damage form, in FIG. 5 the damage length which has been determined in this way being given.

Basically, with the method as in accordance with the invention for separation of periodic portions from the measured rolling element vibration signal information regarding the bearing state can be obtained not only from the signal which occurs with a characteristic period and which was caused by damage to the running surface (inner ring, outer ring or rolling element damage), but also a bearing which is not yet damaged in this sense can be diagnosed. This is possible using the noise signal caused by the rolling motion of the rolling element in a serviceable bearing, since this signal is modulated to a certain extent in a characteristic manner by the forces acting on the bearing. As an example, let us examine a radial bearing which is loaded with a balanced load (force due to weight) which acts in the radial direction and which forms a certain angle to the direction of the acceleration sensor. Since only rolling elements loaded with a force produce a noise signal, a noise signal (or damage signal) is produced essentially only in a certain angle range around the load direction (the width of this angle range depends among others on the bearing clearance, i.e. the gap between the inner ring and the outer ring and it is smaller, the larger the bearing clearance), the sensor of this force essentially sensing only the portion which is between the load direction and the sensor direction, i.e. a certain rolling element only then produces a significant signal when it is located in this area (this applies to noise signals and damage signals equally). This area can also be called the "sensitive lobe" according to its shape in the polar diagram.

Figure 12:
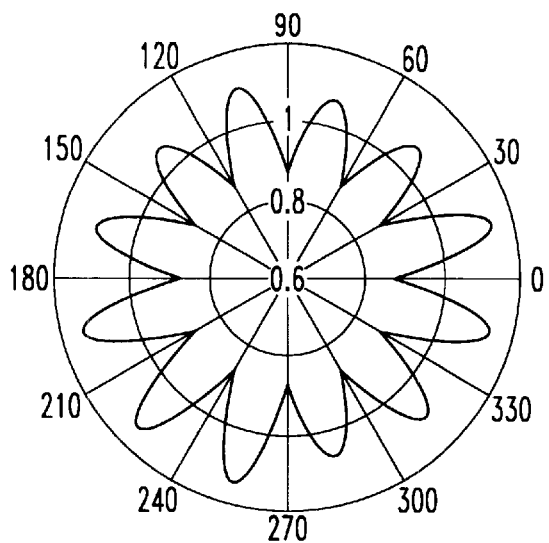
FIG. 12 shows in a polar diagram the output signal of a period form filter which is synchronized to the cage rotation period of a roller bearing.
Figure 13:
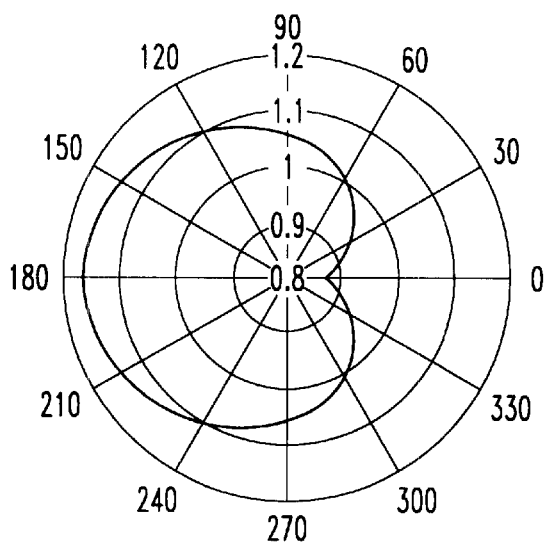
FIG. 13 shows in a polar diagram the corresponding output signal of a period form filter which is synchronized to the outer ring rollover period.

FIG. 12 shows the output signal of a period form filter which is synchronized to the cage revolution period, while FIG. 13 shows the corresponding output signal of a period form filter which is synchronized to the rollover period of the outer ring, in FIG. 13 the angle range being shown stretched according to the number of rolling elements relative to FIG. 12 (i.e. multiplied by the number of rolling elements). In both cases an intact bearing without running surface damage is assumed, i.e. the signal comprises only pure noise amplitude. Modulations of this noise signal with the angle of rotation originate from the above described effect of the "sensitive lobe". As illustrated in FIG. 12, each peak goes back to another rolling element. Since the output signal is formed as the sum of the individual signals, the overall signal shown between the peak does not return to zero (while the respective individual signal of one rolling element over a certain angle range according to the shape of the sensitive lobe would actually be zero). Conclusions about the bearing clearance or the size of the bearing load can be drawn from the sharpness of the peak or the depth of the modulation (this also has effects on the sensitive lobe, but is generally known), and an increased modulation depth can mean an increase in the bearing clearance (due to outer ring wear) or a reduced load. Thus, the wear can be monitored by comparison with the signal shape when the bearing is new.

Furthermore, FIG. 12 shows that the peaks are not all of the same magnitude. This means that the force distribution on the rolling elements is mapped via the noise signal and the rolling elements are resolved individually in the period form filter for cage rotation due to the "sensitive lobe", that the force distribution on the individual rolling elements in this example is not uniform so that this process can be used in the final inspection during production. The outer ring rollover signal from FIG. 13 represents the signal of all rolling elements which has been produced during one complete revolution of the rolling element (i.e. duration of complete rollover of a certain location of the running surface of the outer ring by a certain rolling element), i.e. averaging over all rolling element signals, only rolling elements in the load area contributing and the modulation depth being reduced similarly to FIG. 12 in this case in comparison to the signal of an individual rolling element by the contributions of the rolling elements which are likewise located at least in part in the load area. Finally, this signal from FIG. 13 is an enlargement of a "peak" from FIG. 12 which is averaged over all "peaks". Accordingly, therefore conclusions can also be drawn about the "sensitive lobe" and thus the bearing clearance from the modulation of the noise signal with the outer ring rollover frequency, i.e. by separating the signal portions which are modulated with this period from the signal.

Figure 14:
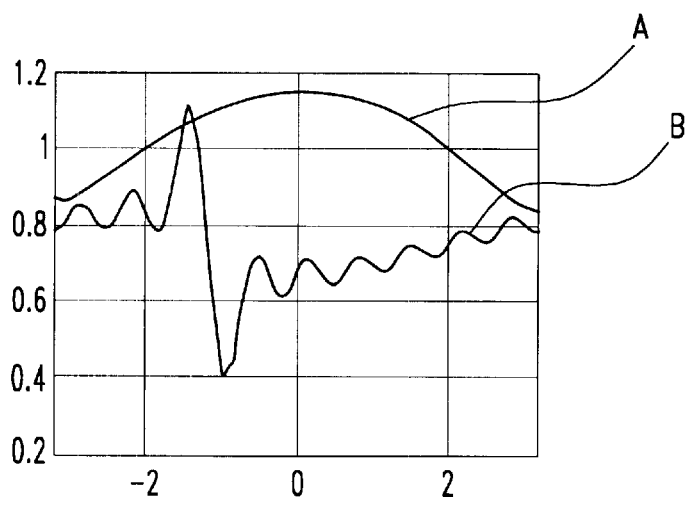
FIG. 14 shows in a linear representation the signal (curve A) and the outer ring damage signal (curve B) in FIG. 13.

FIG. 14 in which in contrast to FIGS. 12 and 13 the angle is plotted linearly, in addition to the noise signal from FIG. 13 (curve A) modulated with the outer ring rollover frequency, shows a signal portion (curve B) which originates from damage in the outer ring running surface. Curves A and B can be obtained from the output signal of the outer ring period form filter by a corresponding compensation calculation or curve matching. In this way it is possible to determine the location of damage (area of the largest deflections in curve B) relative to the position of the "sensitive lobe" so that in principle it is possible to locate the damage.

Figure 6:
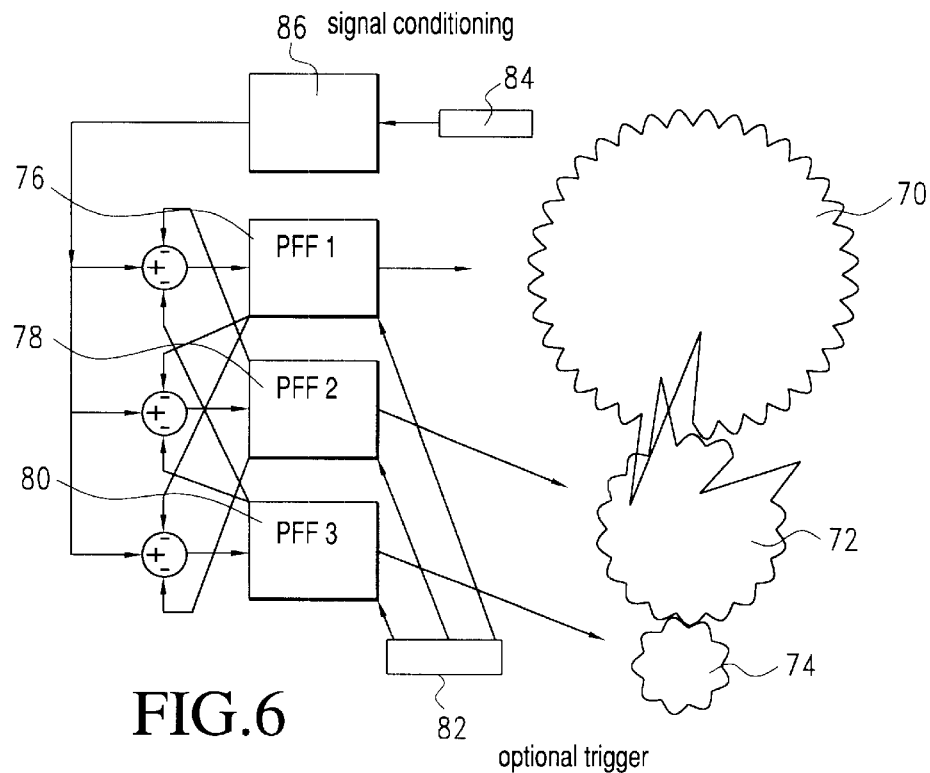
FIG. 6 schematically shows a gear monitoring system.
Figure 7:
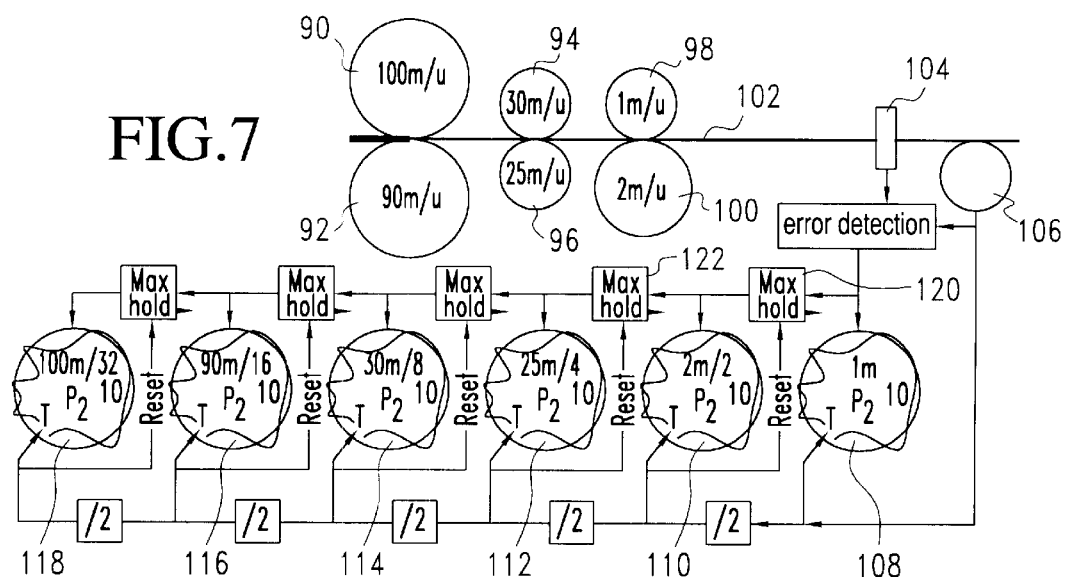
FIG. 7 schematically shows a monitoring system for a wire drawing system.

FIGS. 6 and 7 show two other examples of applications for damage analysis supported by period form filters for cyclically moving components. FIG. 6 schematically shows a diagnosis means for gears in which one corresponding period form filter 76, 78 and 80 at a time is assigned to three gears 70, 72 and 74 with different diameters and thus different rotation frequencies; each filter is synchronized or tuned to the corresponding rotation frequency or rotation period. Since in the case of gears the rotation frequency is uniquely formed via the ratio of the diameters or teeth, generally knowledge of the drive or driven shaft rpm or the rpm of one of the gear elements is sufficient to determine the rpms of the other gear elements accurately enough. In this respect the period form filters 76 to 80 can be controlled by an externally generated control signal from a unit 82 without direct synchronization to the input signal. A vibration sensor 84 picks up, for example on the gear housing, the vibrations of the gears and produces a vibration signal which is processed in a signal conditioning stage 86 which comprises for example a bandpass filter and envelope curve formation in order to be sent to the period form filters 76 to 80 as the input signal, however beforehand the output signal of the period form filter 76 to 80 which is the other at the time being subtracted in order to facilitate separation of the respective period durations. Here damage on the gear elements also generates characteristic damage excitations with a period duration which is characteristic for the respective element so that a corresponding, specific, individual analysis of the elements is enabled.

FIG. 7 schematically shows a diagnosis means for a system for continuous manufacture of a product which is produced by rotating rollers 90 to 100 with surfaces which stamp the product. The product 102 can be for example a wire which is rolled out by the rollers 90 to 100. Faults or irregularities on the roller surface form accordingly on the product and lead to a corresponding signal on a sensor 104 which scans the wire profile. A path transducer 106 determines the feed rate of the product 102. Since the rollers 90 to 100 have different diameters and each cause elongation of the product 102 in the feed direction, the outside periphery of each roller 90 to 100 is mapped on a different length of the product 102 so that for a constant feed direction different period durations for faults in different rollers arise in the profile signal acquired by the sensor 104.

Since here, as in FIG. 6, the rotation frequencies of the rollers are also fixed relative to one another, it is sufficient to acquire the feed rate of the product by the path transducer 106 in order to be able to compute the rotation frequencies of the individual rollers 90 to 100 therefrom. To each roller 90 to 100 a period form filter 108 to 118 is assigned, the period form filter 108 assigned to the roller 98 being synchronized by means of the signal of the path transducer 106 to its rotation frequency or rotation period duration. The output signal of the period form filter 108 and the profile signal of the sensor 106 which is also supplied to the period filter 108 of the input signal form the input signal for a peak value detector 120 which is reset according to the signal of the path transducer 106 and its output signal is used as the input signal for the period form filter 110 which is assigned to the roller 100.

The period form filter 110 is synchronized to a rotation period which corresponds to half the rotation period of the roller 100, the path transducer signal being cut in half and used as the trigger for the period form filter 110. The output of the period form filter 110 and the output of the peak value detector 120 are supplied to another peak value detector 122, etc. The peak value detectors 120, 122, etc. are used to lengthen the signal in stages since the path transducer signal is also cut in half in steps. Aside from this "dividing down", the period form filters 108 to 118 however are synchronized to the resulting different "rolling paths" of the rollers 90 to 100 on the product 102. The "dividing down" is designed essentially to match the accuracies accordingly so that ring storages with the same storage depth can be used. The contents of each period form filter 108 to 118 in the transiently oscillated state correspond finally to mapping of the rolling periphery of the corresponding roller 90 to 100 so that surface damage of the rollers 90 to 100 can be recognized directly as the corresponding damage amplitudes. The damage analysis takes place in an error detection stage 124. Better synchronization between the period form filters and the corresponding rollers can be achieved when a clock generator or rpm sensor is provided for each roller.

Figure 8:
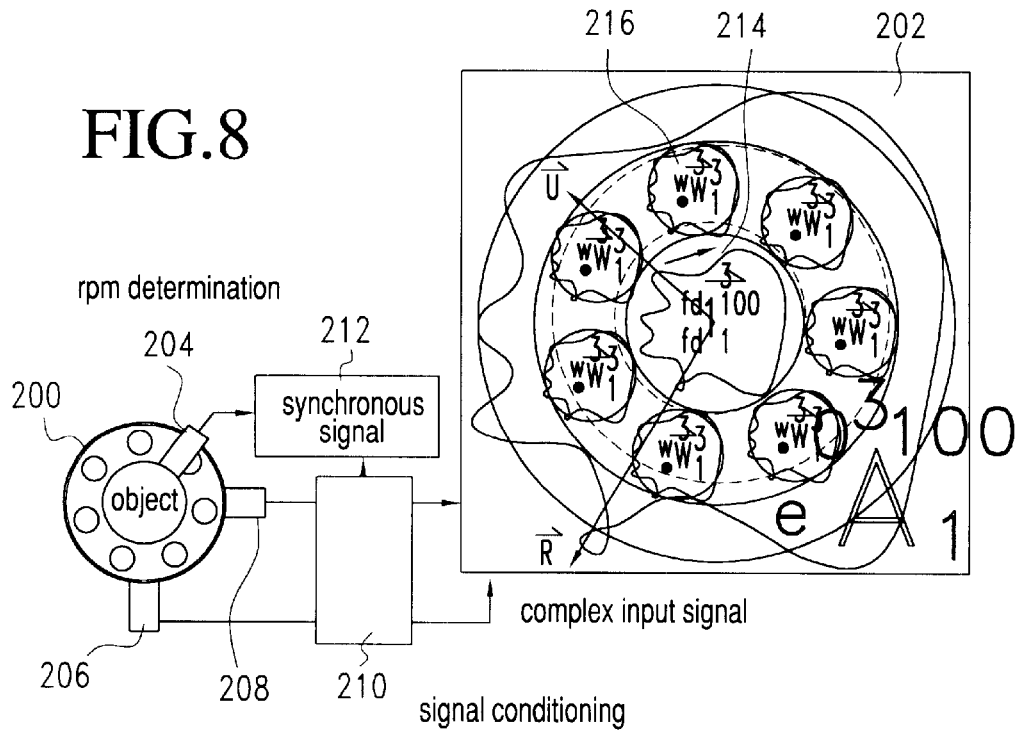
FIG. 8 schematically shows a monitoring system for rotating objects, including a symbolic representation of the linkage of the period form filters used for a roller bearing.

FIG. 8 shows a more general representation of the use of period form filters for diagnostics of cyclically moving machine components, as in FIG. 2 a roller bearing 200. Basically the concept "period form filter" designates a filter which extracts or separates from at least one input signal all signal portions with a certain nominal frequency or nominal period with a certain quality. Fundamentally, a period form filter can have several inputs and outputs, the number of different input signals corresponding to the complexity n, i.e. the number of planes of the period form filter. Each plane can have several lowpass filter arrangements. Another characteristic feature of the period form filter is the type of synchronization of its "rotation".

Figure 9:
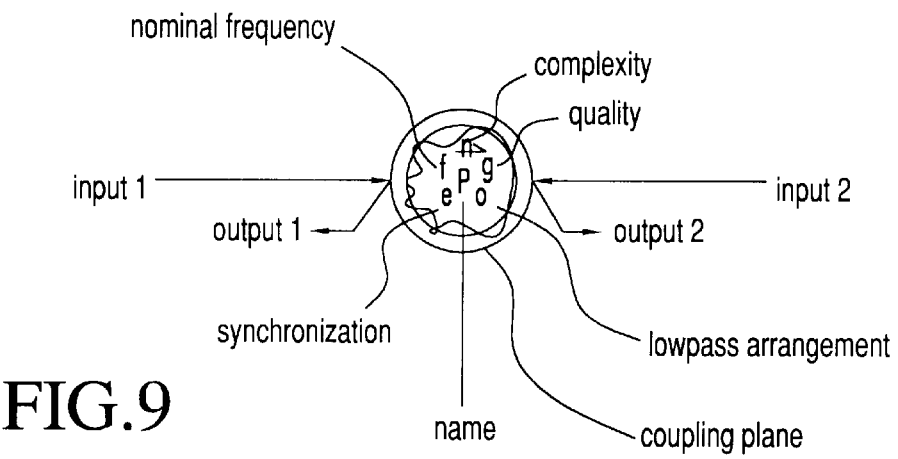
FIG. 9 shows a proposal for a symbolic representation of period form filters.

FIG. 9 shows a proposal for symbolic reproduction or classification of period form filters. Here f designates the nominal frequency, g designates the quality (equals f divided by bandwidth), n is the number of planes or the complexity, o is the lowpass filter arrangement, 0 meaning unfiltered (only delayed), 1 meaning a lowpass filter of the first order, 2 a lowpass filter of the second order, etc., P is the symbol of the period form filter and furthermore there is a symbol which designates synchronization of the period form filter, 0 meaning that there is no synchronization, i meaning synchronization to the input signal, T meaning synchronization to a trigger signal and P meaning synchronization to another period form filter. Furthermore, one direction of rotation can be assigned to each period form filter, and there can be several input and output nodes (coupling points), and the coupling property of the coupling point need not be unconditionally constant, but can depend on the respective "location" of the period form filter which is at the (stationary) coupling point, or on the signal shape to which the period form filter has transiently oscillated. All the initial information of the period form filter is contained in the individual storage sites, i.e. the stored signal shape, so that instead of the output also the signal shape can be represented as the peripheral contour of the period form filter (see FIG. 9).

It could also be stated that the coupling property of a coupling point during one revolution of the period form filter can change depending on the respective angle of rotation and depending on the change of the stored signal shape. Different period form filters can be coupled to one another, as is shown in FIG. 8, where peripheral contact of the individual period form filters designates one coupling point. Between the coupling points known transfer functions can be compensated by the corresponding inverse of this function. Basically a period form filter can also be shown inversely, as is the case in FIG. 8 for the period form filter designated 202. In this case the coupling node or nodes rotate instead of the period form filter.

In FIG. 8 the roller bearing 200 is provided with three sensors, one sensor 204 acquiring the rpm of the shaft and two sensors 206 and 208 at two different sites on the outer ring picking up a vibration signal which is supplied to a signal conditioning stage 210. The signal of the sensor 204 is evaluated in an evaluation unit 212 which acquires the shaft rpm and produces a synchronous signal for a period form filter 214 which is assigned to the inner ring. The period form filter 202 is assigned to the stationary outer ring of the roller bearing 200 and is likewise shown stationary. One period form filter 216 is assigned to each rolling element, their being coupled each to the stationary outer ring period form filter 202 and the inner ring period form filter 214 rotating with the shaft rpm in the manner which corresponds to coupling of the rolling element with the inner ring and outer ring, i.e., in the load area the rolling elements roll on the inner ring and the outer ring without slip, while outside of the load area a loss of phase synchronization or slip occurs.

The coupling between the rolling element period form filters 216 and the inner ring period form filter 214 and outer ring period form filter 202 is configured in a similar way, i.e. the coupling is chosen to be position-dependent, so that the coupling intensity depends on the respective instantaneous position of the corresponding rolling element period form filter 216 on its peripheral path around the inner ring period form filter 214. Furthermore, the coupling intensity also depends on the stored signal shape which corresponds to the rolling path of the corresponding roller bearing element so that for example when there is one tip at the coupling site, coupling is stronger. For example, the unbalance U and a balanced load R can be considered by the coupling which is dependent on the peripheral position.

The outer ring period form filter 202 is supplied with two different input signals from the signal conditioning stage 210; they can be assigned to the sensor 206 or 208. Here the signal from the sensor 206 is a complex signal so that the outer ring period form filter 202 and thus also all other period form filters 214, 216 have three planes, i.e. have complexity 3. All period form filters are made as a first order lowpass filter, the outer ring period form filter 202 and the rolling element period form filter 216 being synchronized to the input signals, while the inner ring period form filter 214 is synchronized to the synchronous signal from the processing stage 212. In the outer ring period form filter 202 the nominal frequency is 0, since this represents a stationary component, while the inner ring period form filter 214 has the shaft rpm as the nominal frequency and the rolling element period form filters 216 have the rolling element rotation frequency as the nominal frequency. The outer ring period form filter 102 and the inner ring period form filter 214 have a high quality of 100, while the rolling element period form filters 216 have a low quality of 3.

At the beginning of the roller bearing diagnosis, all relevant parameters of the period form filters, for example, the stored signal shape, rotation frequency, characteristic and instantaneous value of the coupling intensity, etc. are occupied by correspondingly chosen start values. As soon as the measurement has begun, the two input signals are fed to the outer ring period form filter 202, after a certain time or a certain number of revolutions according to the period form filter quality the individual period form filters "transiently oscillate" to certain signal shapes. As soon as the period form filters have reached this state, i.e., as soon as their contents or stored signal shape are steady-state, an indicative measurement result is present which can then be analyzed to evaluate the state of the roller bearing 200. The measurement results comprise not only the determined shapes, i.e., the stored signal shapes of the individual period form filters which can yield conclusions about the state of the rolling surface of the assigned roller bearing elements, but also, parameters such as the roller bearing rotation frequency and the determined coupling characteristics between the individual period form filters; this allows conclusions regarding unbalance, balanced load, lubrication state, etc. (essentially from the rolling element slip which has been determined in this way).

It goes without saying that the system shown in FIG. 8 can be used accordingly also for diagnosis of a planetary gear. An important aspect of this type of analysis of a dynamic system is that one period form filter at a time is assigned to individual elements of the system to be analyzed, the physical relationships of the elements to one another being simulated by corresponding modeling of the properties of the period form filters and their coupling, however this simulation being subjected to independent checking and optionally correction by the feed of a measurement signal. In contrast to a simulation, however, a simulated signal which then could be compared to real measurement signals to evaluate the simulation is not produced.

We claim:

1. A process for separating periodic time signal portions from a signal, said process comprising the steps of:

providing a rotating ring storage having a plurality of cyclically arranged storage elements being connected in succession to an input device, said ring storage having a controllable rotational frequency;

supplying an input signal to said ring storage;

obtaining at least one desired signal portion as an output signal from said at least one rotating ring storage synchronizing a rotation frequency of said ring storage with a period duration of said desired signal portion.

2. The process as claimed in claim 1, wherein said plurality of storage elements acts as a lowpass filter for said input signal.

3. The process as claimed in claim 2, wherein a lowpass filtering action of the lowpass filter of said plurality of storage elements is digitally simulated.

4. The process as claimed in claim 3, wherein said ring storage is digital and said plurality of storage elements are cyclically-addressed accumulators.

5. The process as claimed in claim 4, wherein said plurality of storage elements are provided in a number which corresponds to a product of the rotational frequency and a sampling rate with which said input signal is digitized.

6. The process as claimed in claim 4, wherein an average value of said input signal occurring during an interval in which said plurality of storage elements is supplied with the input signal is accumulated for each plurality of storage elements during said interval.

7. The process as claimed in claim 1, wherein a frequency matching of said ring storage occurs by a period duration of a desired signal portion determined from said signal and said ring storage is rotated with said rotational frequency determined in this way.

8. The process as claimed in claim 7, wherein a period duration is determined by at least one of search tone analysis, Fourier transform and cepstrun analysis.

9. The process as claimed in claim 1, wherein the rotation of said ring storage is synchronized directly with said input signal.

10. The process as claimed in claim 9, wherein said synchronization occurs using a phase shifter.

11. The process as claimed in claim 10, wherein contents of said plurality of storage elements are multiplied by a derivative of said input signal with a resultant value being accumulated.

12. The process as claimed in claim 11, wherein said rotational frequency of said ring storage is changed according to said accumulated value.

13. The process as claimed in claim 10, wherein a shape of said input signal is processed for synchronization.

14. The process as claimed in claim 13, wherein said input signal is low-pass filtered for synchronization.

15. The process as claimed in claim 13, wherein for synchronization at least a portion of said input signal which does not have a period duration of said desired signal portions is removed from said input signal using a second rotating ring storage.

16. The process as claimed in claim 9, wherein said ring storage comprises at least three ring storages for receiving an input signal, said at least three ring storages rotating with a different period duration.

17. The process as claimed in claim 16, wherein an instantaneously largest output signal is determined during operation of one of said at least three ring storages.

18. The process as claimed in claim 17, wherein said instantaneously largest output signal is output as a valid output signal and said period duration of said at least three ring storages is changed depending upon which one of said at least three ring storages instantaneously has the largest output signal.

19. The process as claimed in claim 18, wherein the period duration of said at least three ring storages is changed in a same direction.

20. The process as claimed in claim 19, wherein said period duration is lengthened when one of said at least three ring storages with a period duration longer than an average period duration of said at least three ring storage has the instantaneously largest output signal.

21. The process as claimed in claim 19, wherein said period duration is shortened when one of said at least three ring storages with a period duration shorter than an average period duration of said at least three ring storages has the instantaneously largest output signal.

22. The process as claimed in claim 19, wherein said period duration is not changed when one of said at least three ring storages with a period duration equal to an average period duration has the instantaneously largest output signal.

23. The process as claimed in claim 1, wherein the contents of said plurality of storage elements are mapped into in a steady-state storage once said output signal exceeds a predetermined threshold value.

24. The process as claimed in claim 1, wherein a difference between said input signal and said output signal of said ring storage is formed to eliminate said desired signal portions from said output signal.

25. The process as claimed in claim 1, wherein said ring storage comprises a plurality of ring storages having different rotation frequencies for extracting signal portions with different period durations.

26. The process as claimed in claim 25, wherein said plurality of ring storages being interconnected such that an output signal from a respective one of plurality of ring storages is subtracted from an input signal from the remaining said plurality of ring storages.

27. The process as claimed in claim 1, wherein said ring storage comprises plurality of ring storages for acquiring an identical input signal and which rotate with different period durations.

28. The process as claimed in claim 27, wherein at least one of an output signal of each of said plurality of ring storages being output for at least one of evaluation and the output signal of one of said plurality of ring storages with the largest output signal being automatically selected for further evaluation.

29. A period form filter for separating periodic signal portions from a signal, said period form filter comprising:

a rotating ring storage having a plurality of cyclically arranged storage elements connected in succession to an input device which sends a signal of a rotation frequency of said rotating ring storage to said storage elements; and a synchronization means for synchronizing said rotational frequency with a period duration of a desired signal portion.

30. The period form filter as claimed in claim 29, further comprising a plurality of output devices respectively connected in succession to said plurality of storage elements according to the rotation frequency.

31. A process for determining damage on at least one cyclically moving machine component comprising the steps of:

providing a sensor;
sensing a signal caused by a movement of said at least one cyclically moving machine component using said sensor;
separating from said signal at least one signal portion with an adjustable period; and
analyzing a remaining portion of said signal to determine if damage has occurred to said at least one cyclically moving machine component.

32. The process as claimed in claim 31, wherein said adjustable period is a period of revolution of a shaft for driving said at least one cyclically moving machine component.

33. The process as claimed in claim 31, wherein said at least one cyclically moving machine component rotates and said signal is a vibration signal.

34. The process as claimed in claim 31, wherein said analyzing step is performed in a time domain of said separated signal portion.

35. The process as claimed in claim 31, wherein said at least one cyclically moving machine component is at least one of an outer ring, a rolling element and an inner ring of a roller bearing, the signal is an amplitude modulated noise signal and the adjustable period is a modulation period of the noise signal.

36. The process as claimed in claim 31, wherein said at least one cyclically moving machine component is a roller bearing, and wherein at least one of an amplitude modulated noise signal portion of the outer ring rollover frequency and a period of cage revolution signal portion is separated from said signal in order to derive information regarding bearing play.

37. The process as claimed in claim 36, wherein a modulation depth is used to evaluate bearing play.

38. The process as claimed in claim 31, wherein said at least one cyclically moving machine component is at least one of an outer ring, a rolling element and an inner ring of a roller bearing.

39. The process as claimed in claim 38, wherein a plurality of period form filters are assigned to at least one of said outer ring, said inner ring and said rolling element, and wherein at least one ring storage is provided, each of which has a respective specific rotational frequency of completed storage access that corresponds to a respective rotational frequency of said outer ring, said inner ring and said rolling element.

40. The process as claimed in claim 39, wherein said at least one rotating ring storage has a plurality of cyclically arranged storage elements that are connected in succession to an input device.

41. The process as claimed in claim 40, wherein the rotation frequencies of said at least one ring storage corresponds to at least one of a rollover frequency of said outer ring, a rollover frequency of said inner ring and a rollover frequency of said rolling element.

42. The process as claimed in claim 41, wherein said plurality of period form filters sends an output signal which is subtracted from a preceding output signal and is supplied to a respective at least one first period form filter as an input signal.

43. The process as claimed in claim 39, wherein a respective one of said plurality of period form filters being connected to a shaft for driving said at least one cyclically moving machine component, said respective one of said plurality of period form filters producing an output signal which is subtracted from a preceding output signal and is supplied to those remaining said plurality of period form filters as an input signal.

44. The process as claimed in claim 43, wherein said input signal is conditioned before it is supplied to said remaining plurality of period form filters.

45. The process as claimed in claim 44, further comprising a bandpass filter for filtering said input signal, said bandpass filter being set such that the output signal of said plurality of period form filters is at a maximum level for said inner ring.

46. The process as claimed in claim 45, wherein from a dynamic model, a transfer function is determined between a deflection of said rolling element caused by damage and a corresponding sensor signal.

47. The process as claimed in claim 46, wherein said sensor signal is corrected by a bandpass filter with respect to said transfer function before said sensor signal is supplied to said plurality of first period form filters.

48. The process as claimed in claim 47, wherein a bandpass filter is connected to a respective one of said plurality of first period form filters for said outer ring and a respective one of said plurality of period form filters for said inner ring.

49. The process as claimed in claim 48, wherein said corresponding bandpass filter corrects at least one of a transfer function for a damage signal originating from contact between said outer ring and said rolling element and a transfer function for a damage signal originating from contact between said inner ring and said rolling element.

50. The process as claimed in claim 49, wherein two of said plurality of period form filters are associated with said rolling element.

51. The process as claimed in claim 50, wherein one of said two of said plurality of period form filters being connected to said bandpass filters, said one of said two of said plurality of period form filters having a different transfer function from the second of said plurality of period form filters.

52. The process as claimed in claim 51, wherein a time change of the contents of said at least one ring storage of said plurality of period form filters for said outer ring, said inner ring and said rolling element is analyzed in order to determine at least one of an unbalanced load and balanced load acting upon said roller bearing.

53. The process as claimed in claim 52, wherein a sum of the balanced load and the unbalance load is determined by forming a ratio between amplitudes of said signal portions which originate from said inner ring contact and said outer ring contact for said output signal of the period form filter for said rolling element.

54. The process as claimed in claim 53, wherein a contact angle of said roller bearing is determined from the rotation frequency of said plurality of period form filters for said outer ring, said inner ring and said rolling element.

55. The process as claimed in claim 39, wherein a quality of said period form filter for said rolling element is set such that it transiently oscillates within one roller bearing revolution.

56. The process as claimed in claim 55, wherein a time constant of said period form filter for said rolling element is chosen as a product of a roller bearing period and a load angle divided by 360°.

57. The process as claimed in claim 56, wherein with each revolution of the roller bearing a map of the ring storage is produced when the output is maximum.

58. The process as claimed in claim 57, wherein the ring storage is reset after each revolution and from the comparison of different maps a phase shift between the different maps and thus the slip angle of said rolling element is determined.

59. The process as claimed in claim 58, wherein the phase shift is determined from a maximum of a ring storage correlation between the individual maps.

60. The process as claimed in claim 58, wherein individual maps are corrected with respect to their phase shift and then added to form the output of said at least one period form filters.

61. The process as claimed in claim 55, wherein a phase of rotation of the ring storage of a period form filter corresponding to said rolling element is controlled according to the determined slip angle of said rolling element in order to compensate for rolling element slip.

62. The process as claimed in claim 39, wherein the output signal of each said at least one period form filters is sorted by its amplitude.

63. The process as claimed in claim 62, wherein a damage length for said outer ring, said inner ring and said rolling elements is determined from the amplitude-sorted signal.

64. An apparatus for determining damage on at least one cyclically moving machine component, said apparatus comprising:
- a sensor for sensing an input signal produced by a movement of said at least one cyclically moving machine component;
- separating means for separating said input signal into at least one portion with an adjustable period from a remaining portion of said input signal; and,
- analyzing means for analyzing at least one of said at least one portion with an adjustable period and said remaining portion.

65. The apparatus as claimed in claim 64, wherein said at least one cyclically moving machine component is a plurality of rotating gear components, each of which rotate with a different rpm.

66. The apparatus as claimed in claim 65, wherein at least one period form filter is assigned to each of said plurality of rotating gear components, with a ring storage which rotates with a frequency of rotation of each of said plurality of rotating gear components.

67. The apparatus as claimed in claim 64, wherein said at least one cyclically moving machine component is a plurality of rotating rollers used for stamping a surface of a continuous product.

68. The apparatus as claimed in claim 67, wherein at least one period form filter is assigned to each of said plurality of rotating rollers such that a signal is obtained from a profile of said continuous product in a feed direction.

69. The apparatus as claimed in claim 68, wherein a feed rate of said continuous product is acquired and used to synchronize said at least one period form filter.

70. A process for separating signal portions with a certain period from a signal, the process comprising the steps of:
- dividing the signal into sections with a certain duration which corresponds approximately to a desired period duration;
- storing the signal sections;
- determining at least one of a phase shift and a direction of the phase shift of the signal sections;
- correcting the signal sections with respect to the phase shift;
- adding the signal sections which are phase-corrected to obtain a sum of the signal sections with a period duration to be determined.

71. The process as claimed in claim 70, wherein the signal sections are adjacent portions of said signal.

72. The process as claimed in claim 70, wherein the phase shift between a first of said signal sections and a second of said signal sections is determined.

73. The process as claimed in claim 71, wherein the first of said signal sections and the second of said signal sections are added phase-corrected and the resulting summation signal is stored, this procedure being iteratively repeated for other signal sections provided that each respective summation signal assumes the role of the first signal section and a signal section currently processed at the time assumes the role of the second signal section.

74. The process as claimed in claim 70, wherein the phase shift is determined by determining a maximum correlation between two different signal sections.

75. The process as claimed in claim 74, wherein the correlation is a ring correlation.

76. The process as claimed in claim 75, wherein a weighting of a signal section during addition is proportionate to the maximum correlation determined at the time.

77. The process as claimed in claim 70, wherein the desired period duration is verified and the signal section durations are matched to changes of the desired period duration.

78. The process as claimed in claim 70, wherein the signal is supplied as an input signal to a rotating ring storage which is formed by a plurality of cyclically arranged storage elements which are supplied in succession with the input signal supplied to an input port of the ring storage and said input signal having a rotation period which corresponds to the signal section duration.

79. The process as claimed in claim 78, wherein after a certain number of revolutions of the ring storage, storage contents are read out and stored as a map and the ring storage is reset.

80. The process as claimed in claim 79, wherein each map is added phase-corrected.

* * * * *